United States Patent [19]

Taguchi et al.

[11] Patent Number: 4,575,601

[45] Date of Patent: Mar. 11, 1986

[54] KEYBOARD OF THE MEMBRANE TYPE

[75] Inventors: Toshimichi Taguchi; Hideyuki Akao, both of Osaka, Japan

[73] Assignee: Sharp Kabushiki Kaisha, Osaka, Japan

[21] Appl. No.: 347,972

[22] Filed: Feb. 11, 1982

[30] Foreign Application Priority Data

Feb. 19, 1981 [JP] Japan ................................. 56-25280

[51] Int. Cl.4 ........................... G06F 3/02; H05B 6/68

[52] U.S. Cl. ............................ 219/10.55 B; 200/5 A; 340/365 S; 340/365 A; 340/365 R

[58] Field of Search ........... 340/365 R, 365 A, 365 S; 200/5 A, 86, 238, 340, 159 B; 219/10.55 R, 10.55 B

[56] References Cited

U.S. PATENT DOCUMENTS 3,732,389 5/1973 Kaelin et al. .................... 340/365 A
3,908,100 9/1975 Richard .......................... 340/365 R
4,078,257 3/1978 Bagley ........................... 340/365 R
4,145,584 3/1979 Otterlei .............................. 200/5 A
4,158,115 6/1979 Parkinson ........................... 200/5 A
4,301,337 11/1981 Eventoff ............................. 200/5 A
4,304,991 12/1981 Weber ............................ 340/365 A
4,360,716 11/1982 Fiorella ............................. 200/5 A

*Primary Examiner*—James J. Groody
*Attorney, Agent, or Firm*—Birch, Stewart & Birch

[57] ABSTRACT

There is disclosed an electrical signal input device suitable for use in a microwave oven or other household appliance for introducing a setting into those appliances through a simple one-touch actuation. The input device is of the membrane type which includes an actuator member composed of a generally flat plate having a plurality of elongated actuator sections on a surface thereof and carrying a plurality of first electrodes disposed wholly through an opposite surface thereof and facing against the plurality of the actuator sections, a substrate disposed in conjunction with the actuator member and having a plurality of second electrodes each corresponding to one of the first electrode. The first and second electrodes are brought into electrical contact when the corresponding one of the actuator sections is depressed and becomes bent. Discrete values of electrical resistance are sensed as a function of where the first and second electrodes are in electric contact along the length of the actuator sections.

18 Claims, 9 Drawing Figures

FIG. 2
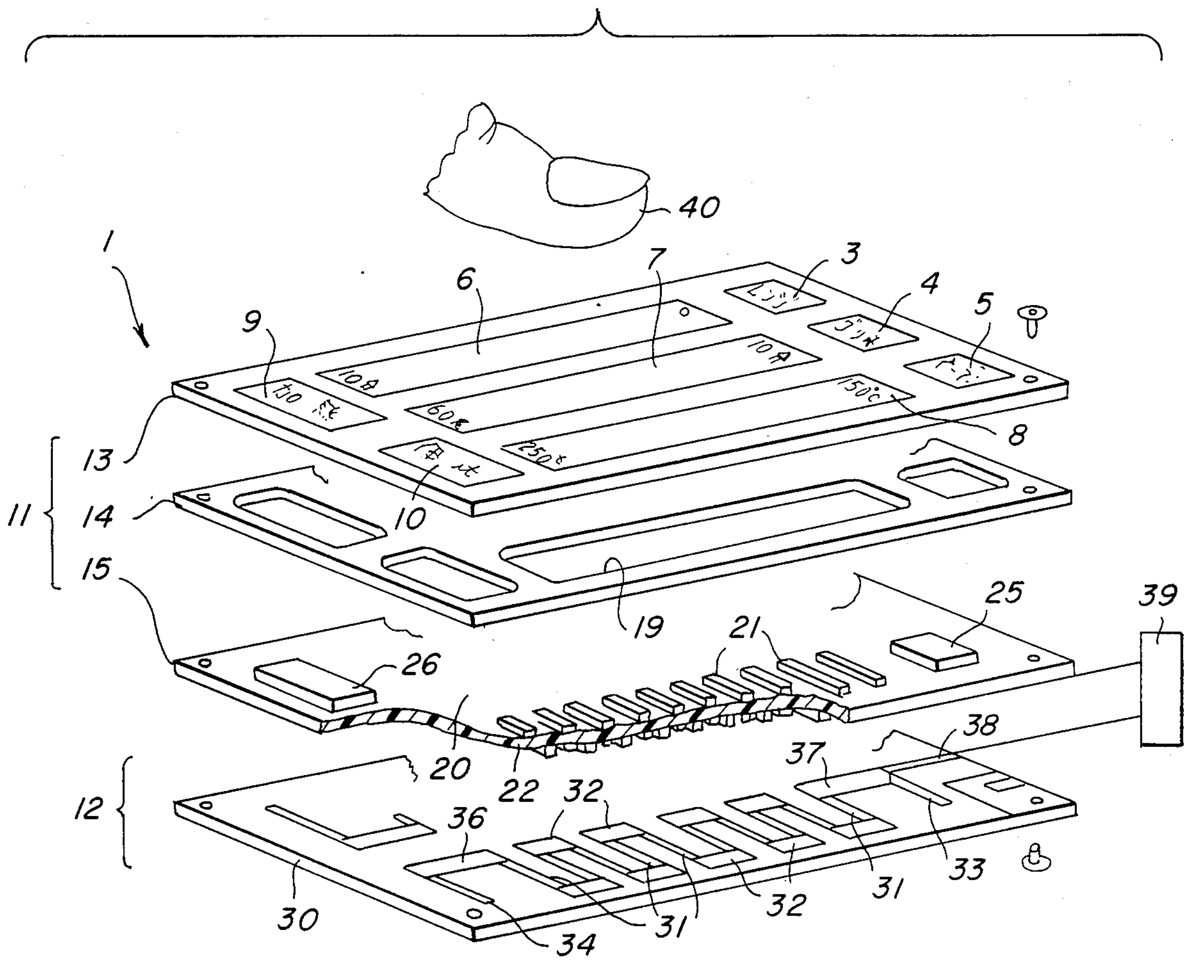
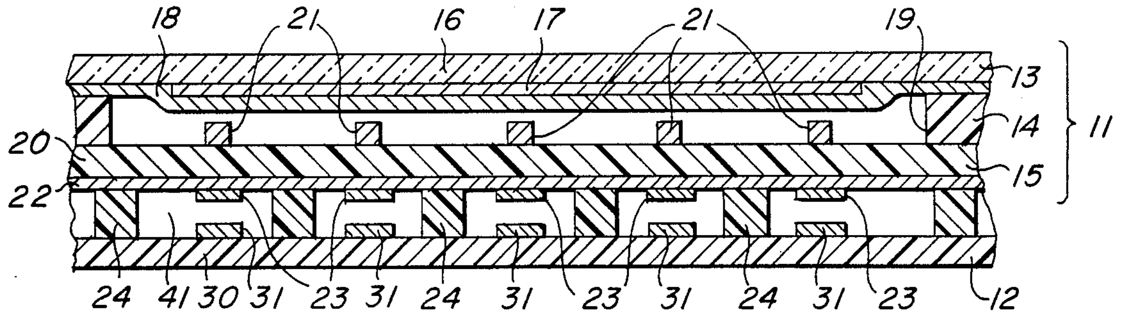
FIG. 3

F/G. 4
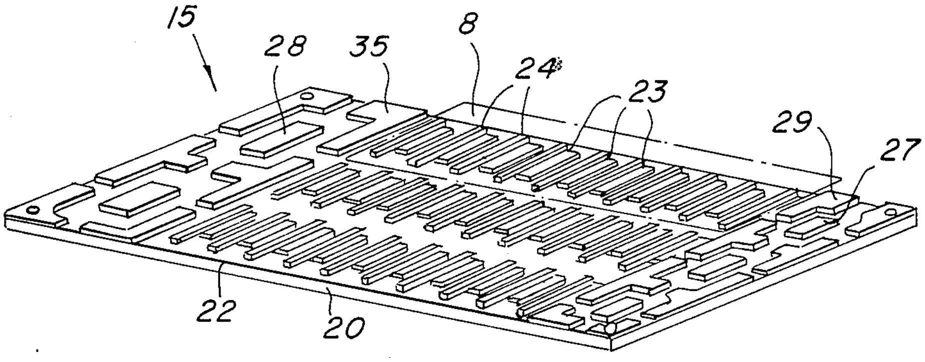
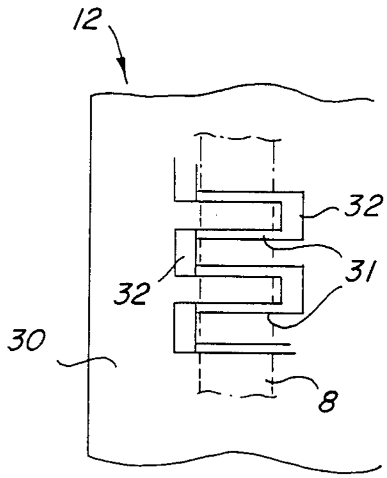
F/G. 5

FIG. 6
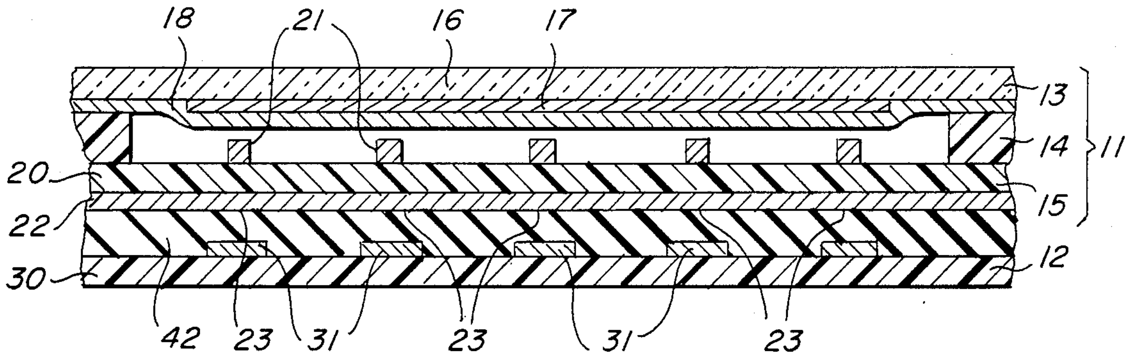
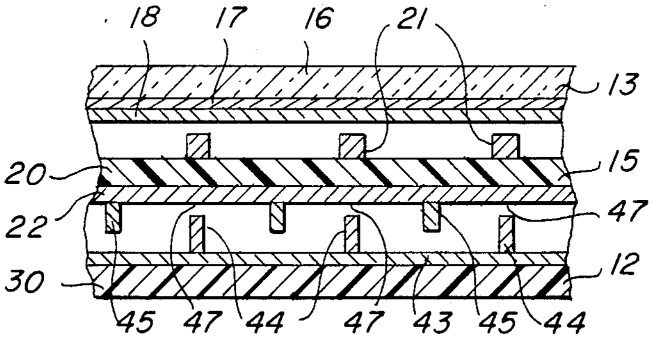
FIG. 7

KEYBOARD OF THE MEMBRANE TYPE

BACKGROUND OF THE INVENTION

This invention relates to an input device, and more particularly it relates to a membrane-type of input device for introducing electrical signals into a microcomputer-based circuit or other circuits.

To accomplish a wide range of functions in a variety of household appliances including microwave ovens, microcomputers are in increasing use. A number of key switches, variable resistors of rotary or slide type and the like are used in conjunction with those microcomputers for introduction of electrical signals thereto. In the case of microwave ovens, variable resistors are more advantageous than key switches for entering numerical representations of heating parameters such as time and temperature because the former demands merely selecting a desired resistance value while the latter requires actuation of a desired number of key switches. Even though it is advantageous in the above aspect, the variable resistor has inherent disadvantages in that the structure is complex and costly and its protruding knob is difficult to clean. The last problem is critical especially in microwave ovens which should be constantly kept clean.

OBJECT AND SUMMARY OF THE INVENTION

Accordingly, it is an object of the present invention to provide an electric signal input device which is capable of introducing a number of information bits selectively through a simple operation and a minimum of expenditures.

To accomplish the above mentioned object, the present invention provides an electric signal input device which comprises an actuator means composed of a generally flat plate having a plurality of elongated actuator sections on a surface thereof and carrying a plurality of first electrodes disposed wholly through an opposite surface thereof and facing against said plurality of actuator sections. A substrate is disposed in conjunction with said actuator means and has a plurality of second electrodes one corresponding to each of said first electrode. Said first and second electrodes are brought into electric contact when the corresponding one of said actuator sections is depressed and becomes bent. Means are provided for sensing where said first and second electrodes are in electric contact along the length of said actuator sections.

Therefore, the input device includes the elongated array of first electrodes disposed along the opposite surface of the actuator means also carrying the corresponding number of actuator sections and the elongated array of the second electrodes disposed on the substrate each in opposing relationship with the respective one of said first electrodes so that an electric signal descriptive of where the first and second electrodes are brought into electric contact may be derived through only one depression of the corresponding one of the actuator sections. A number of information bits may be, therefore, selectively introduced through simple operation. Further, the input device embodying the present invention is simpler in structure than the conventional variable resistor of either the rotary or slide type. The actuator means is flat, easy to clean and useful widely for home appliances where cleanliness is of importance.

BRIEF DESCRIPTION OF THE DRAWING

For a more complete understanding of the present invention and for appreciating further objects and advantages thereof, reference is now made to the following description taken in conjunction with the accompanying drawing, in which:

FIG. 2 is an exploded perspective view of the electrical signal input device of FIG. 1;

FIG. 3 is a cross-sectional view of the electrical signal input device shown in FIG. 2;

FIG. 4 is a perspective view of the electrical signal input device as viewed from back;

FIG. 5 is a partial plan view of an electrode sheet 15;

FIG. 6 is a cross-sectional view of another embodiment of the present invention;

FIG. 7 is a cross sectional view of still another embodiment of the present invention;

DETAILED DESCRIPTION OF THE INVENTION

Figure 1:
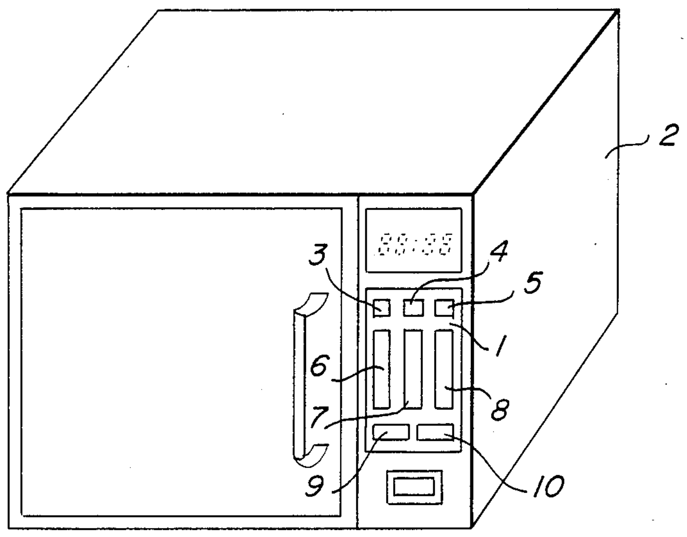
FIG. 1 is a perspective view of a cooking appliance having a built-in electrical signal input device constructed according to an embodiment of the present invention.

Referring now to FIG. 1, there is illustrated a perspective view of a cooking appliance 2 having a built-in electrical signal input device 1 constructed according to an embodiment of the present invention. The electrical signal input device 1 has an actuator region 3 for selection of either microwave or dielectric heating of food, an actuator region 4 for selection of grill heating as is necessary in simmering food and an actuator region 5 for selection of oven heating as is needed for browning food. Further, disposed respectively below those actuator region 3 to 5 are an actuator regions 6 for setting microwave heating time, an actuator region 7 for setting grill heating time and an actuator region 8 for setting oven heating temperature, all of which are designed according to the present invention. An actuator region 9 is depressed when food is to be heated and an actuator region 10 is depressed when heating is to stop. Electrical signals from the electrical signal input device 1 are introduced into a microcomputer 39 (see FIG. 2) contained in the appliance 2 for controlling the heating of food.

FIG. 2 is an exploded perspective view of the electrical signal input device 1 and FIG. 3 is a longitudinal cross-sectional view of the input device 1. The electrical signal input device 1 generally includes an actuator member 11 and a substrate 12 disposed behind the actuator member 11. The actuator member 11 is made of a flexible and elastic plate with a generally flat laminated structure which includes a cover sheet 13, a spacer 14 and an electrode sheet 15. The cover sheet 13 includes a transparent plastic film 16 carrying on its rear surface indicia 17 characteristic of the actuator region 8 as formed by printing of elastic ink or adhering. An aluminum foil 18 is adhered, printed, deposited or otherwise affixed on cover sheet 13 in such a manner as to screen the film 16 and the indicia 17.

The spacer 14 is made of electrically insulating plastic material having punched or perforated portions corresponding to the respective actuator regions 3 to 10. When a particular one of the actuator regions is not actuated, the spacer 14 keeps its associated pusher or pushers 21 out of contact with the aluminum foil 18 and holds the film 16 flat. It is understood that the actuator regions 6 to 8 extend preferably along the vertical direction of the cooking appliance 2.

The rear electrode sheet 15 includes a protective film 20 typically of electrically insulating and flexible plastic material. On a surface of the protective film 20 facing against the cover sheet 13 there are equally spaced and aligned a plurality of pushers 21 along the length of the actuator region 8. The pushers are made of plastic material having a rigidity high enough not to collapse when being depressed by the operator's finger 40. An aluminum foil 22 is adhered, deposited, printed or otherwise affixed entirely on the opposite surface of the protective film 20 adjacent the substrate 12.

FIG. 4 is a perspective view of the electrode sheet 15 as viewed from the side of the substrate 12. On the aluminum foil 22 there is a plurality of first electrodes 23 aligned at a given interval along the length of the actuator region 8, which electrodes are typically made of a electrically conductive material with low resistance such as carbon. These electrodes may be disposed thereon by painting, printing or other conventional manners. The first electrodes 23 are located beneath the respective pushers 21. Spacers 24, typically formed of an electrically insulating material such as a plastic are interposed between each two adjacent first electrodes 23 along the length of the actuator region 8. The spacers 24 extend along the width of the actuator region 8 and have a rigidity high enough not to collapse when being depressed. In conjunction with the remaining actuator regions 6 and 7, the pushers 21, the first electrodes 23 and the spacers 24 are provided in a likewise manner. To set up the actuator regions 5 and 9, pushers 25 and 26 are mounted on the protective film 20 of the electrode sheet 15 and electrodes 27 and 28 are disposed beneath the pushers 25 and 26 together with spacers 29 and 35. The architecture of the remaining actuator regions 3 and 4 are similar to that of the actuator region 5 and the architecture of the actuator region 10 is similar to that of the actuator region 9. An electrode 34 corresponds to the actuator region 10. The spacers 24 have a thickness greater than the sum of the thicknesses of the first electrodes 23 and second electrodes 31 described hereinafter so that the first and second electrodes 23 and 31 may be kept in non-contacting relationship when a particular one of the actuator regions is not being actuated.

The substrate 12 is disposed face-to-face with the actuator member 11. On a support film 30 typically of an electrically insulating plastic material there is disposed a plurality of the second electrodes 31 typically formed of a conductive material such as carbon by painting, printing or other conventional manners. The respective ones of the second electrodes 31 are aligned along the length of the actuator region 8 to correspond to the respective ones of the first electrodes 23. The second electrodes 31 are connected in a serpentine fashion by means of conductors 32 which are also formed of an electrically conductive material such as carbon and are disposed on the support film 30 by painting, printing or other conventinal manners.

FIG. 5 is a plan view of a portion of the substrate 12 carrying the second electrodes 31 and the conductors

32. The second electrodes 31 have a low resistance and the conductors 32 have a high resistance. It is preferred that the transparent film 16, the protective film 20 and the support film 30 be made by of materials having substantially the same coefficient of thermal expansion, e.g., polyester and polyvinyl chloride.

An electrode 33 is provided in connection with the electrode 27 in the actuator region 5 and an electrode 35 is provided which may come into contact with the electrode 35 in the actuator region 10. The second electrodes 31 are connected to the electrode 33 by way of a conductor 37 having a high resistance. Further, the second electrodes 31 are connected to the electrode 34 by way of a conductor 36 having a high resistance. The resistance extending between a terminal 38 leading from the second electrodes 31 and the electrodes 33 and 34 connected via the conductors 32, 36 and 37 and the aluminum foil 22 is sensed by a microcomputer 39 which governs the heating operation of the cooking appliance. If any one of sections in the actuator region 8 along its length is depressed by the finger 40, then the cover sheet 13 depresses selectively the corresponding one of the pushers 21 so that the first electrode 23 beneath the depressed one of the pushers 21 comes into contact with the second electrode 31. The resistance between the terminal 38 and the aluminum foil 22 is lower when a pair of the first and second electrodes 23 and 31 near to the terminal 38 are in contact with each other and higher when first and second electrodes remote from the terminal 38 are in contact. With such measurements of the resistance, it is possible to detect discrete resistance values as a function of the finger-actuated position along the length of the actuator region 8. It is, therefore, possible to select a heating temperature along the length of the actuator region 8 and to introduce selectively the desired temperature for the cooking appliance. Whether the electrodes 27 and 33 and the electrodes 28 and 34 are in contact is determined in a similar manner.

The spacers 24, 29 and 35 mounted on the electrode sheet 15 are islands with no closed space and spaces 41 (see FIG. 3) defined by the electrode sheet 15 and the substrate 12 are open to the atmosphere. This leads to certainty that the first electrodes 23 may be brought into electrical contact with the associated second electrodes 31.

FIG. 6 is a sectional view similar to FIG. 3 but shows another embodiment of the present invention. This alternative embodiment is analogous to the above illustrated embodiment and components similar to those in the previous embodiment are represented by the same reference numbers. Attention is invited to the provision of a pressure-sensible conductive rubber member 42 interposed between the aluminum foil 22 secured on the protective film 20 of the electrode sheet 15 and the substrate 12. The pressure-sensible conductive rubber member 42 has elasticity and the electrical property that its local resistance becomes lower when being depressed. The pressure-sensible conductive rubber member 42 may be set up by a composite including 6 parts by weight of neoprene rubber and 4 parts by weight of conductive material powders such as silver powders. Respective portions of the aluminum foil 22 immediately above the second electrodes serve as the first electrodes 23. When the actuator region 8 is depressed in part by the finger, the portion of the alumimum foil 22 directly below the finger-depressed portion depresses and deforms as the first electrode the pressure-sensible rubber member 42 and moves the deformed portion of the rubber member close to the second electrode 31 so that a path is bridged having a low value of resistance between the aluminum foil 22 and the second electrode 31. Provided that the resistance between the aluminum foil 22 and the terminal 38 (see FIG. 2) may now be measured, it is possible to sense the finger-actuated position along the length of the actuator region 8.

Figure 8:
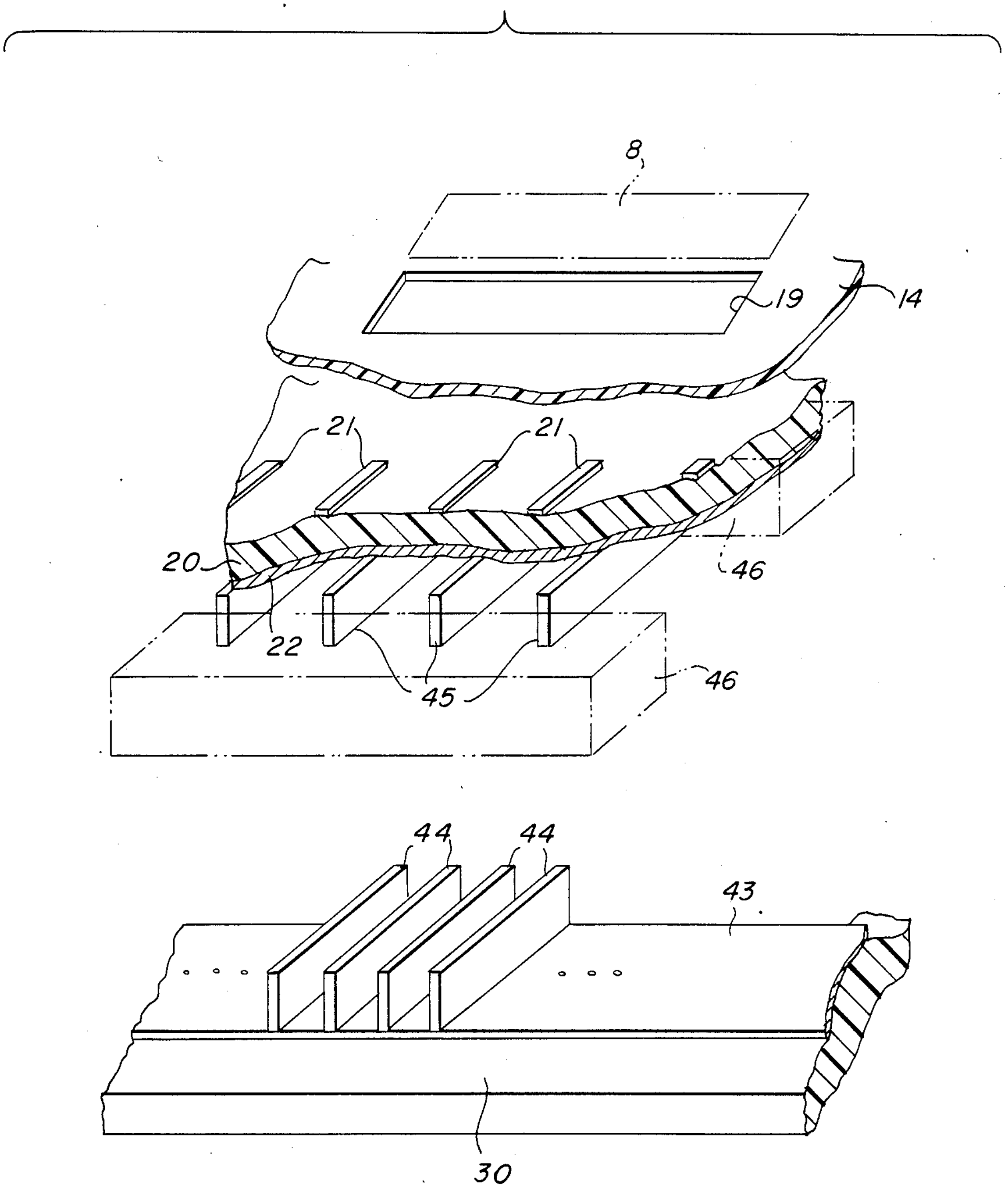
FIG. 8 is a partially exploded perspective view of the electrical signal input device as illustrated in FIG. 7.

FIG. 7 is a cross-sectional view of still another embodiment and FIG. 8 is a partially exploded perspective view thereof. This embodiment is analogous to the previous embodiment, but is featured by that an elongated, strip-like electric conductor 43 of high resistance carbon or other similar electrically conductive material is painted, printed or otherwise disposed on the support film 30 on the substrate 12 and a predetermined number of second electrodes 44 of a low resistance are set up on the conductor 43 and equally spaced along the length of the actuator region 8. As described previously, the aluminum foil 22 is adhered on the protective film 20 of the electrode sheet 15 and a predetermined number of contactors 45 are mounted on the aluminum foil 22 in such a manner as to be directed toward the substrate 12. On the aluminum foil 22, there is further disposed a spacer 46 which keeps the second electrodes 44 away from the aluminum foil 22 and the contactors 45 away from the conductor 43 when any section of the actuator region is not being actuated. Upon actuation of any one of the sections of the actuator region 8, the second electrode 44 comes into contact with the portion of the aluminum foil 22 which serves as the first electrode 47 immediately above the second electrode 44. The resistance extending between the aluminum foil 22 and one end of the conductor 43 varies as a function of the position where electrical contact is established. The contactors 45 may also come into contact with the conductor 43 and their positions measured similarly.

Figure 9:
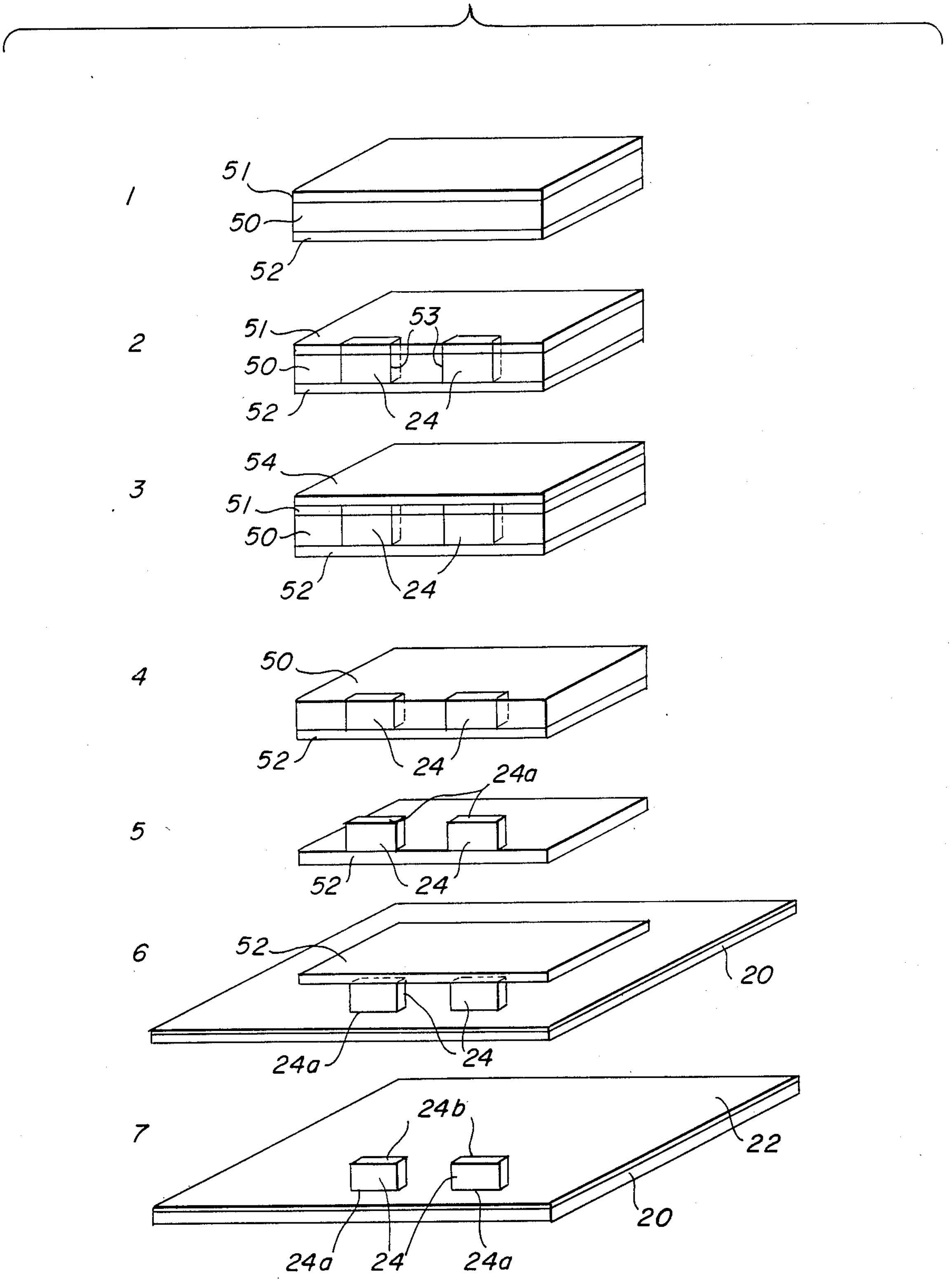
FIG. 9 is a perspective view for explanation of the procedure by which the spacers 24 are disposed on a protective film 20.

Referring to FIG. 9, there is illustrated the procedure by which the spacers 24 are disposed and aligned on the aluminum foil 22 on the protective film 20. As seen in FIG. 9(1), an adhesive is applied to both surfaces of a film 50 forming the spacers 21 and strip sheets 51 and 52 are adhered thereon. When the strip sheets 51 and 52 are removed, the adhesive remains on the film 50 with which the film 50 may be adhered in the following manner. Slits 53 are defined in the strip sheet 51 and the film 30 by means of a Thomson model or the like as shown in FIG. 9(2). It is noted that the slits 53 are formed in the strip sheet 52. A sheet 54 with an adhesive applied thereon is secured on a surface of the strip sheet 51 with the aid of the adhesive on the sheet 54 as seen in FIG. 9(3). Thereafter, the sheet 54 and the strip sheet 51 are peeled off at the same time. The result is illustrated in FIG. 9(4). Provided that the film 50 is removed from the strip sheet 52, the insulator islands 24 remain on the strip sheet 52 as seen in FIG. 9(5), with the adhesive on the summits **24*a* thereof. While the strip sheet 52 is held upside down, the summits 24*a* are adhered to the aluminum foil 22 on the protective film 20 of the electrode sheet 15. FIG. 9(7) shows the situation after the strip sheet 52 has been removed, wherein the spacers 24 are equally aligned on the aluminum foil 22. The bottom surfaces 24*b* of the spacers 24 opposite the summit surfaces 24*b* are fixedly secured on the support film 30 by means of the adhesive remaining on the bottom surfaces 24*b***.

Although in the above-illustrated embodiments the second electrodes 31 are connected in series by means of the conductors 32, it will be obvious to those skilled in the art that electrical signals are introduced into the microcomputer 39 by way of individual lines leading to the respective ones of the second electrodes 31. The cover sheet 13 may be made of a single flexible film or the indicia may be printed or otherwise disposed on the foil for the actuator regions 3 to 10.

While only certain embodiments of the present invention have been described, it will be apparent to those skilled in the art that various changes and modifications may be made therein without departing from the spirit and scope of the invention as claimed.

What is claimed is:

1. A microwave oven apparatus comprising:

an actuator means including a generally flat plate having first and second major surfaces and having a plurality of elongated actuator sections therein, each of said plurality of elongated actuator sections being adapted to permit actuation of a plurality of switches distributed along its length, said actuator means having a like plurality of electrically interconnected first discrete electrodes on said second major surface with a first discrete electrode being associated with each of said plurality of switches;

substrate means having a first major surface thereon, said first major surface being disposed in juxtaposition to said second major surface of said actuator means and being coextensive therewith over at least one of said elongated actuator sections, said substrate means having a like plurality of electrically interconnected second discrete electrodes on its first major surface disposed so as to be facing and spaced way from said first discrete electrodes and capable of selectively establishing electrical contact with a respective one of said plurality of first discrete electrodes upon deformation of said actuator means at its respective switch location along one of said elongated actuator sections;

resistor means connected between said second electrodes;

each of said plurality of elongated actuator sections being flexibly actuatable to reduce the spacing between said first and second electrode thereby reducing the electrical resistance between said actuator means and said substrate means at one of said switch locations;

means for sensing discrete resistance values of said resistor means as a function of the respective switch location where a first electrode is brought into electrical contact with the respective second electrode;

means for controlling microwave heating time in said microwave oven in response to a discrete resistance sensed by a first of said plurality of elongated actuator sections;

means for controlling grill heating time in said microwave oven in response to a discrete resistance sensed by a second of said plurality of elongated actuator sections; and means for controlling oven heating temperature in said mircowave oven in response to a discrete resistance sensed by a third of said plurality of elongated actuator sections.

2. A microwave oven apparatus according to claim 1, further including means for isolating each of the first electrodes from making undesired electrical contact with the respective second electrode.

3. A microwave oven apparatus according to claim 2, wherein the means for isolating comprises a plurality of spacers interposed between the actuator means and the substrate means and between adjacent switches.

4. A microwave oven apparatus according to claim 3, wherein the spacers are affixed to and depend from the second major surface of the actuator means.

5. A microwave oven apparatus according to claim 4, wherein the spacers are of a thickness greater than the sum of the thicknesses of the first and second electrodes.

6. A microwave oven apparatus according to claim 2, wherein the means for isolating comprises a spacer disposed adjacent to the elongated actuator section.

7. A microwave oven apparatus according to claim 6, wherein the means for isolating comprises a plurality of spacers interposed between the actuator means and the substrate means and between adjacent switches.

8. A microwave oven apparatus according to claim 7, wherein the spacers are affixed to and depend from the second major surface of the actuator means.

9. A microwave oven apparatus according to claim 1, wherein the electrodes within one of the two pluralities of electrodes are formed of a material of a relatively low electrical resistivity and the electrodes are interconnected by conductors formed of a material of a relatively higher electrical resistivity which form said resistor means.

10. A microwave oven apparatus according to claim 9, wherein the electrode interconnecting conductors are discrete and interconnect two adjacent electrodes along the elongated actuator section so that the plurality of electrodes are serially interconnected.

11. A microwave oven apparatus according to claim 10, wherein the electrode interconnecting conductors are disposed on the first major surface of the substrate means and interconnect the plurality of second electrodes.

12. A microwave oven apparatus according to claim 11, wherein the actuator means includes an additional actuator section with associated electrodes on the actuator means and substrate means and wherein the electrodes on the substrate means associated with the additional actuator section are serially interconnected with the second electrodes associated with the elongated actuator section through additional conductors formed of the material with a relatively higher electrical resistivity than said second electrodes.

13. A microwave oven apparatus according to claim 9, wherein the first major surface of the substrate means has a layer of the material of a relatively higher electrical resistivity disposed thereon and wherein the plurality of second electrodes are disposed discretely on the exposed surface of the layer of the material of a relatively higher electrical resistivity.

14. A microwave oven apparatus according to claim 13, wherein the means for sensing is connected to the layer adjacent a first end of the elongated actuator section.

15. A microwave oven apparatus according to claim 1, wherein the plurality of first electrodes depend from the second major surface of the actuator means.

16. A microwave oven apparatus according to claim 15, wherein the second major surface of the actuator means has a layer of electrically conductive material disposed thereon with the depending first electrodes affixed to the exposed surface of the layer of electrically conductive material.

17. A microwave oven apparatus according to claim 1, wherein the actuator means is comprised of a front flexible sheet on which is defined the elongated actuator section, the front flexible sheet forming the first major surface and serving to protect the device from an environment, a spacer sheet in juxtaposition to the front flexible sheet and having an opening therethrough coextensive with the elongated actuator section, said spacer sheet of electrically insulating material having openings aligned with said actuator sections, and a rear flexible electrode sheet in juxtaposition to the spacer sheet and forming the second major surface of the actuator means, the rear electrode sheet having on the surface facing the spacer sheet a like plurality of switch actuators each of which is disposed directly opposite a respective one of the first electrodes whereby upon depression of the front flexible sheet on a desired portion of the elongated section, the front flexible sheet is depressed within the opening in the spacer and contacts the desired switch actuator and upon further depression causes the desired first electrode to electrically contact the associated second electrode.

18. A microwave oven apparatus according to claim 17, wherein there is further included on the rear of the front flexible sheet an additional layer containing appropriate indicia associated with the respective switches in the elongated section.

* * * * *